United States Patent [19]

Brecht et al.

[11] Patent Number: 4,682,822

[45] Date of Patent: Jul. 28, 1987

[54] ELECTRONIC CARRIAGE BRAKE FOR A DRAWING MACHINE

[75] Inventors: Gerhard Brecht, Stuttgart; Dieter Sackmann, Marbach, both of Fed. Rep. of Germany

[73] Assignee: Marabuwerke Erwin Martz GmbH & Co, Tamm, Fed. Rep. of Germany

[21] Appl. No.: 682,327

[22] Filed: Dec. 17, 1984

[30] Foreign Application Priority Data

Dec. 31, 1983 [DE] Fed. Rep. of Germany ....... 3347689

[51] Int. Cl.[4] .............................................. F16D 71/04

[52] U.S. Cl. ...................................... 303/20; 188/164; 33/438; 33/1 M

[58] Field of Search .................. 303/20; 188/161, 164, 188/165; 364/426, 550; 318/612, 614, 468, 466, 369; 33/438, 441, 1 M, 18.1, 505

[56] References Cited

U.S. PATENT DOCUMENTS

| | | | |
|---|---|---|---|
| 3,239,735 | 3/1966 | Raider et al. | 318/614 |
| 3,668,494 | 6/1972 | Agin | 318/612 |
| 4,268,969 | 5/1981 | Koenuma | 33/438 |
| 4,315,371 | 2/1982 | Kotani et al. | 33/1 M |
| 4,386,470 | 6/1983 | Perry | 33/438 |
| 4,430,797 | 2/1984 | Eder | 33/438 |

FOREIGN PATENT DOCUMENTS

| | | |
|---|---|---|
| 2028442 | 3/1980 | United Kingdom . |

*Primary Examiner*—John W. Caldwell, Sr.
*Assistant Examiner*—Alvin Oberley
*Attorney, Agent, or Firm*—Fred Philpitt

[57] ABSTRACT

On an electronic carriage brake for a drawing machine, the power stage (18) associated with a brake magnet (12) for a considered co-ordinate direction is triggered directly via the output signal from a comparator (24), to which the measured position signal (20) and the nominal-value signal (26) are applied, as well as additionally via a monostable trigger circuit (30) which is triggered by the output signal from the mentioned comparator (24).

15 Claims, 8 Drawing Figures

ELECTRONIC CARRIAGE BRAKE FOR A DRAWING MACHINE

The invention relates to an electronic carriage brake for a drawing machine.

Such a carriage brake is described in DE OS No. 29 52 253. The brake magnet thereof, when excited by the associated control, presses a friction element against the carriage guide rail, thus causing the carriage to be stopped. Even if one designs the carriage brake for very quick and sudden braking, which is disadvantageous with respect to the wear of the braking surfaces on the guide rail, one does not obtain an exact braking of the carriage in the desired position since the draughtsman's hand does not move the carriage with a force and velocity that is always constant. With the position sensors available today it is possible without difficulty to measure the position of the carriage accurately to 0.1 mm; and it is the object of the present invention to develop an electronic carriage brake as described hereinafter in such a way that the nominal position of the carriage can be set with a comparable accuracy.

According to the invention, this problem is solved by an electronic carriage brake as described hereinafter.

With the carriage brake according to the invention, one obtains in any event an engagement of the brake for a specified period of time when the nominal carriage position is reached. If after this period of time, in which the carriage is in any event braked to the zero velocity, the nominal position is found to have been exactly reached, then the brake continues to be engaged. If, by contrast, the carriage has come to a standstill a little forward of the nominal position or has overshot the nominal position a little, then the brake is released since there is present neither an output signal from the monostable trigger circuit nor an output signal from the comparator, to which the output signal from the position sensor and the output signal from the nominal-value input unit is applied. The user of the drawing machine knows under these circumstances that the nominal position has indeed not yet been reached but that only a very small deviation from the nominal position is present, and he can now move the carriage fully to the nominal position with little force and at a low velocity, and when this position is reached the brake is permanently engaged, with the carriage exactly reaching the nominal position. This moving of the carriage can be effected in a purely tactile manner without any visual checking.

According to the invention, it is possible, with a constructional expenditure that is only slightly increased compared to the known carriage brake, to position a carriage with an accuracy which is markedly smaller in size than the drawing errors which are still due to the guide of the drawing apparatus.

In the case of the carriage brake, the brake magnet is driven with less power when the exact nominal position of the carriage has been reached, which is sufficient for retaining it in the nominal position. In this way, the energy requirement is kept low.

With the development of the invention it is possible to operate the carriage brake optionally, with reduced drawing accuracy requirements, so that the release thereof does not occur when the nominal position has been overshot to a slight extent.

The development of the invention is again of advantage with respect to a low energy consumption of the carriage brake since the times which are required for moving the carriage during working are short compared with the times in which the carriage is in a desired position. Furthermore, this renders impossible any unintentional displacement or dropping of the carriage in the event of the energy supply failing.

In the case of a carriage brake as set forth herein, the release of the brake magnet for that co-ordinate direction in which the nominal position was first approximately reached is only effected when the nominal position is also approximately reached in the second co-ordinate direction. This prevents the carriage for one co-ordinate direction being unintentionally moved away again from the nominal position by a relatively long distance following the release of the brake as the second carriage is moved towards the nominal position.

In the case of a carriage brake as set forth herein, the nominal position is in many cases already exactly reached when the carriage is moved towards it for the first time since the braking point is calculated each time from the nominal position and taking into account the overshoot during the last setting operation.

The development of the invention as set forth herein ensures that in each case only the first overshoot during the movement of the carriage towards the nominal position is used for the specification of the braking point during the subsequent setting.

In the case of a carriage brake as set forth herein, when the modified braking point is reached, there occurs automatically a change from the modified nominal value to the exact nominal value.

With the carriage control according to the invention, it is in principle possible to reach the nominal position by purely tactile checking. In the case of a carriage brake as set forth herein, there is additionally provided a visual display for the deviation of the actual position from the nominal position so that, if there are two independent carriages, one can directly steer towards the nominal point in both co-ordinate directions by diagonal movements.

In the case of a carriage brake as set forth herein, one directly has an image of the deviation from the nominal point that is enlarged in a manner similar to a magnifier.

In the case of a carriage brake as set forth herein, the edge zone of the display is non-linear so that it is also possible to show qualitatively any major deviations from the nominal position.

A deviation display as set forth herein can be realised with a very low constructional expenditure. The developments of the invention according as set forth herein, are of advantage with respect to a particularly clear detection of the respective deviation.

The invention will hereinafter be explained in more detail with the aid of exemplified embodiments and with reference to the drawings, in which.

Figure 1:
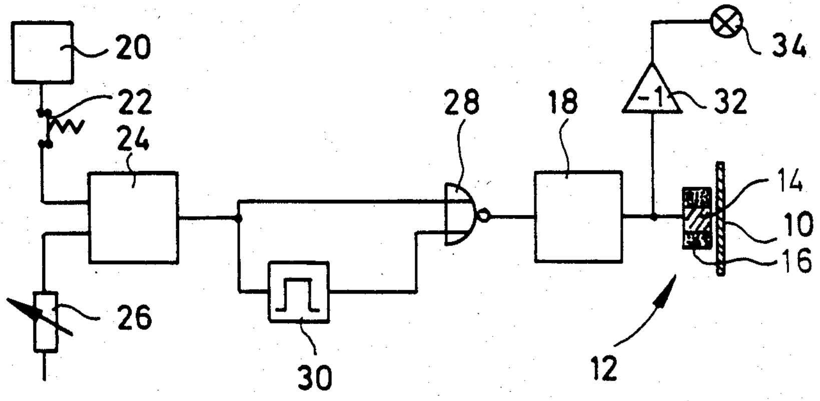
FIG. 1 shows a block diagram of an electronic carriage brake.

In FIG. 1, a magnetisable plate, which is fastened on a drawing board not shown, is designated 10. With the plate 10 there co-operates a controllable magnetic unit 12 consisting of a permanent magnet 14 and a field winding 16 which is coaxial therewith. The field winding is connected to the output of an associated power stage 18 and can be supplied by this stage with a current, the magnitude of which is exactly such that the field generated by the field winding 16 cancels the field of the permanent magnet 14. In this case, the magnetic unit 12 can then be moved freely over the plate 10, whilst the permanent magnet 14 tightly locks the magnetic unit 12 on the plate 10 if the field winding 16 is not excited.

The signal application to the input terminal of the power stage 18 is effected in dependence on the output signal from a linear-position sensor 20 which co-operates with a carriage which is not shown and which is fitted on the drawing board so as to be slidable along one co-ordinate direction. The output signal from the linear-position sensor 20 is given via a switch 22, which is biassed to the closed state by a spring, to one input terminal of a comparator 24 which only provides an output signal if exactly the same level is applied to its two inputs. The second input of the comparator 24 is connected via a potentiometer 26 to a voltage source. The potentiometer 26 serves as the nominal-position sensor for the carriage.

The output signal from the comparator 24 is directly given to one input terminal of an OR element 28. The output signal from the comparator 24 furthermore causes a monostable trigger circuit 30, whose output is connected to the second input terminal of the OR element 28, to be triggered. The inverted output signal from the OR element 28 serves for driving the power stage 18. To the output of the latter there is simultaneously connected, via an inverter 32, a lighting unit 34, e.g. a light-emitting diode, which therefore lights up when the magnetic unit 12 is locked on the magnetisable plate 10.

The above-described carriage brake operates as follows:

The desired actual position of the carriage is set on the potentiometer 26. As long as the carriage has not yet reached this position, the output signal from the linear-position sensor 20 is different from the output signal from the potentiometer 26, so that no signal is obtained at the output of the comparator 24. Consequently, a signal is applied to the input of the power stage 18 and the field winding 16 is excited. The magnetic unit 12 can be freely moved over the plate 10. If, as the carriage is displaced, the nominal position is reached, then a signal is obtained at the output of the comparator 24 so that the excitation of the field winding 16 is terminated. As a result, the magnetic unit 12 can only be moved with difficulty in relation to the plate 10, and the carriage is braked. However, since the draughtsman initially endeavours to move the carriage further and since the engagement of the brake cannot occur suddenly, alone with a view to preventing any wear of the braking surfaces that is unduly extensive, the carriage is moved beyond the desired actual position so that the output signal from the comparator 24 disappears. However, since this signal caused the monostable trigger circuit 30 to be triggered, the field winding 16 continues to be without current. The period of the monostable trigger circuit 30 has been chosen to be such that the carriage is fully braked even if considerable force is applied and if the nominal position is approached at a high velocity. When a complete state of rest has come about, the field winding 16 is excited again, following the decay of the output signal from the monostable trigger circuit 30, so that the draughtsman can now move the carriage again towards the nominal position in the opposite direction. Since this movement occurs only over a short distance and since the draughtman knows that the nominal position has almost been reached, the nominal position will not be overshot again as the nominal position is reached once more from the opposite side, so that the output signal from the comparator 24 is permanently obtained and the excitation of the field winding 16 is consequently permanently terminated.

In order to move the carriage from the thus exactly reached nominal position for a further setting, the potentiometer 26 is adjusted accordingly. Now the output signal from the comparator 24 disappears and the magnetic unit 12 can once again be freely moved over the plate 10. Instead, one can open the switch 22 and carry out less critical drawing work in the meantime without any digital electronic braking to the actual position and subsequently return to the last electronically braked position, with the switch 22 closed again, exactly as described above.

Figure 2:
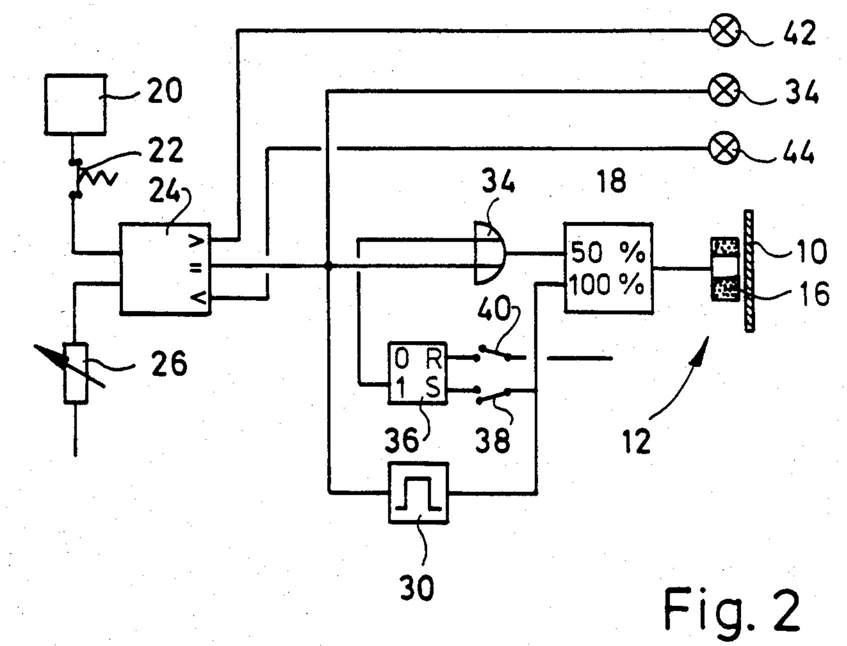
FIG. 2 shows a block diagram of a modified electronic carriage brake.

Parts of the carriage brake shown in FIG. 2 which have already been described above with reference to FIG. 1 are provided with corresponding reference symbols.

The magnetic unit 12 now comprises only the field winding 16, so that an engagement of the carriage brake is obtained when the power stage 18 operates. The power stage 18 now has two different input terminals "100%" and "50%", which cause, when a signal is applied thereto, the full or half the braking current to be applied to the field winding 16. Half the maximum braking current suffices for the operation of the magnetic unit as a holding brake. The "100%" input terminal of the power stage 18 is again connected via the monostable trigger circuit 30 to one output terminal of the comparator 24, at which a signal is obtained if the input signals are identical. To the "50%" input terminal of the power stage 18 there is also applied, via an OR element 34, the output signal from the comparator 24 indicating the identicalness of the input signals.

Another input terminal of the OR element 34 is connected to the "1" output of a bistable trigger circuit 36, whose setting input is connected via a switch 38 to the output of the monostable trigger circuit 30. The switch 38 is closed by the draughtsman if only a reduced drawing accuracy is required. The carriage brake then always continues to be engaged once the desired nominal position has been overshot. For terminating the holding current for the field winding 16 there serves a normally open switch 40 which is connected to the resetting terminal of the bistable trigger circuit 36 and to a voltage source.

In the exemplified embodiment shown in FIG. 2, the lighting unit 34 is directly connected to the output terminal of the comparator 24 indicating the identicalness of the input signals; further lighting units 42, 44 are connected to additional output terminals of the comparator 24, to which a signal is applied if the output signal from the linear-position sensor 20 is larger or smaller than the signal obtained at the output of the potentiometer 26. The three lighting units 34, 42, 44 thus together form a visual display for the deviation of the carriage from the respective desired nominal position.

Figure 3:
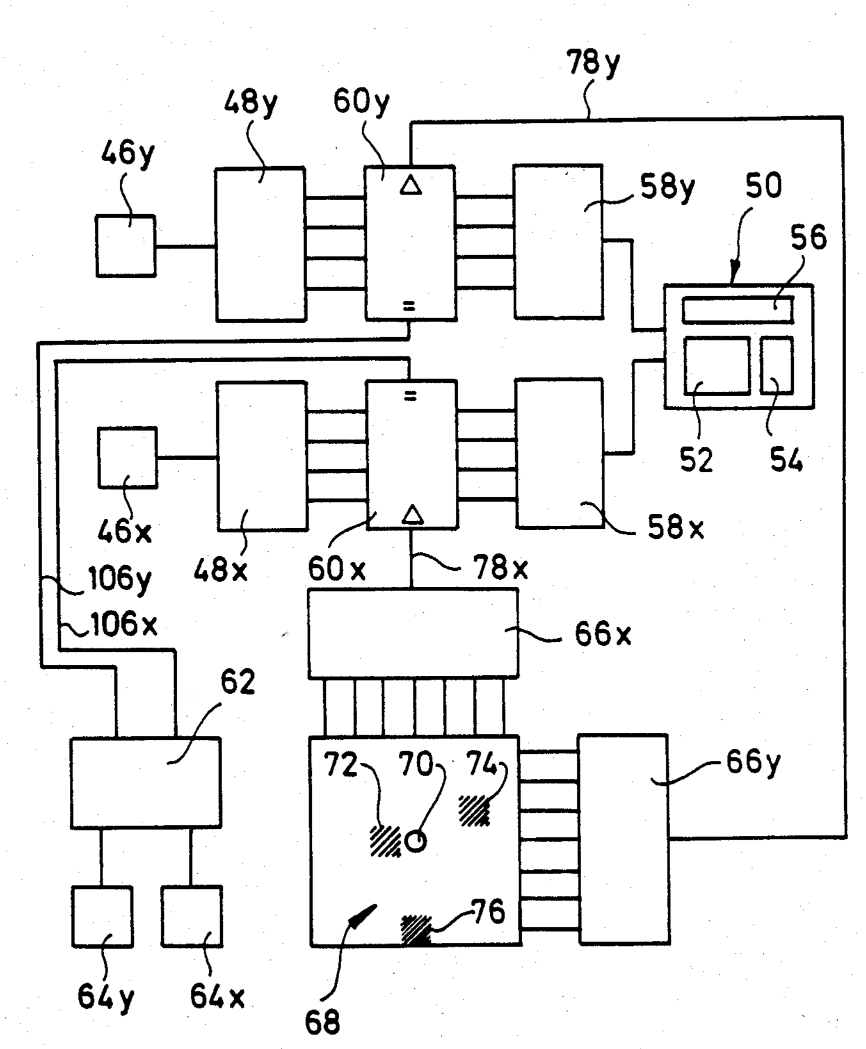
FIG. 3 shows a block diagram of a further modified electronic carriage brake with an electronic magnifier for displaying the deviation of the actual position from the nominal position.

FIG. 3 shows a block diagram for two electronic carriage brakes in co-ordinate directions which are perpendicular to each other. The components associated with the co-ordinate directions and which are comparable as regards their mode of operation are provided with the same reference numerals, to which an "x" or "y" has however been attached for differentiation.

For each co-ordinate direction, a position sensor 46, which provides a specified number of pulses for each specified path increment, is connected to the counting terminal of a counter 48, whose reading thus corresponds to the actual position of the carriage in the considered co-ordinate direction. The direction of movement is detected and the up- and down-counting of the counter 48 is controlled by measures which are known in the field of digital position sensors and need not be explained in detail here.

A control panel 50 has a numerical input board 52, a key board 54 for changing-over to the different coordinate directions and for the direct triggering of different braking functions as well as a display board 56. Controlled via the key board 54, the input board 52 can be optionally connected to nominal-value stores 58 for the x and y directions.

To digital comparators 60 there are applied the output signals from the counters 48 and the nominal-value stores 58. They provide a signal at a first output terminal "=" if the two digital input signals are identical. The difference between the input signals, including the sign, is provided at a second output terminal "Δ".

The output terminals "=" of the two comparators 60 are connected to the input terminals of an actuating circuit 62, by means of which two brake magnet units 64 are excited, of which each may be formed by an adapted combination of a field coil and a permanent magnet or only by a field coil, as has been described analogously above with reference to FIGS. 1 and 2. Details of the actuating circuit 62 will be described later with reference to FIG. 5.

The "Δ" outputs of the comparators 60 are connected to the inputs of addressing circuits 66 which effect the line or column addressing of a display board 68. The latter may be, for example, a liquid crystal display board or a gas discharge display board with two sets of crossing electrodes, each crossing surface of electrodes specifying a singly addressable display point. Details of the addressing circuits 66 will be explained hereinafter with reference to FIG. 4.

The display board 68 has a central marking 70 which corresponds to the nominal position of the two carriages. Examples of deviations of the drawing head carried by the carriages from the desired nominal point are indicated by display points 72, 74 and 76.

Figure 4:
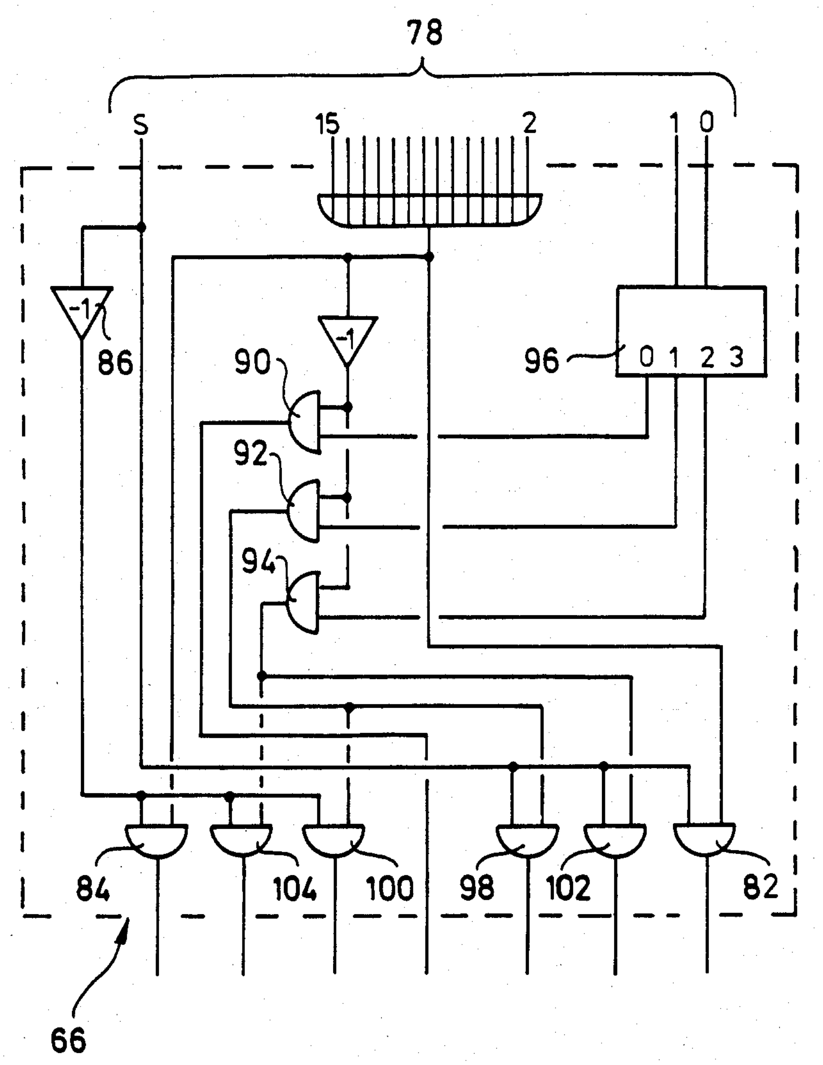
FIG. 4 shows a circuit diagram of an addressing circuit for the display board of the carriage brake shown in FIG. 3.

FIG. 4 shows details of the addressing circuits 66 which are connected via cables 78 to the "Δ" outputs of the comparators 60. The conductors of the cables 78 have been numbered 0–15 in accordance with the place value of the 16 bits long number transmitted via the cable. S designates the conductor placing the sign of the number.

With the addressing circuit shown here it is intended to produce a linear display of the deviation for two increments of respectively 0.1 mm on either side of the nominal position. All other major deviations are to lead to the activation of a circle of outwardly located display points of the display board 68 so that the display board 68 is a true-to-scale magnifier for small deviations but, for large deviations from the nominal position, still reveals approximately the direction in which the drawing head has to be moved to the nominal point.

For this purpose, the conductors "2" to "15" are connected together via an OR element 80, whose output signal is used for addressing the line or column farthest to the outside. To this end, the output of the OR element 80 is connected to the first inputs of two AND elements 82, 84, to the second inputs of which there are applied the signal on the conductor "S" and the output signal from an inverter 86 respectively, which inverter is connected to this conductor. If an output signal is present at the OR element 80, AND elements 90, 92, 94, whose second inputs are each connected to one of the outputs of a binary-to-decimal converter 96, are blocked via another inverter 88.

If all the signals on the conductors "2" to "15" are of a low level, then the AND elements 90 to 94 are opened and one obtains at the outputs thereof an output signal if the nominal point has been exactly reached or has been missed by one or two path increments.

The output of the AND element 90 is directly connected to the addressing circuit 66 output line serving for triggering the central line or column electrode. The outputs of the AND elements 92 and 94 are connected to the inputs of further AND elements 98, 100 and 102, 104, to the second inputs of which there is applied the signal on the conductor "S" and the output signal from the inverter 86 respectively.

Figure 5:
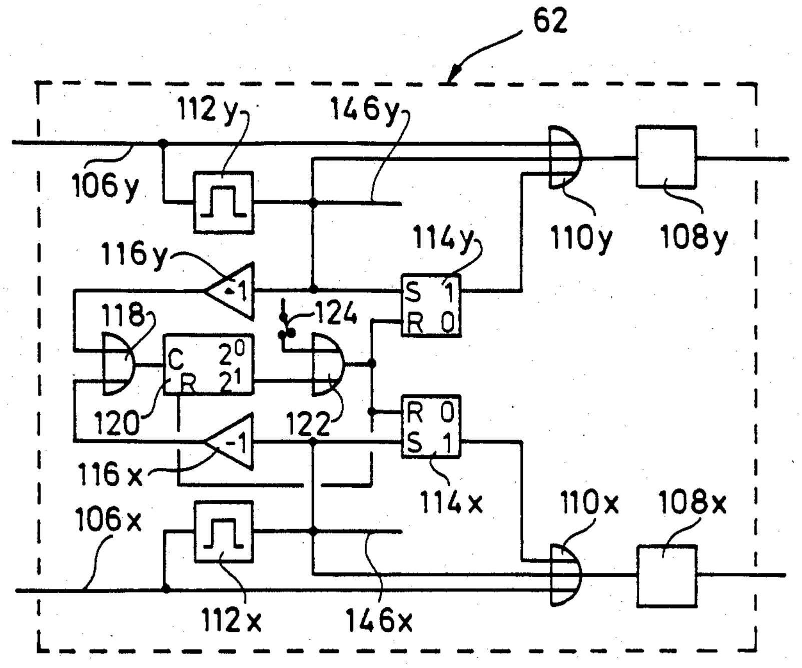
FIG. 5 shows a block diagram of an actuating circuit for the brake magnets, which are associated with the two co-ordinate directions, of the carriage brake shown in FIG. 3.

FIG. 5 shows details of the actuating circuit 62 which is connected via lines 106 to the "=" output terminals of the comparators 60. The actuating circuit 62 comprises two cross-coupled channels, in which components corresponding to one another as regards their functions are again provided with the same reference numerals, an attached "x" or "y" serving for differentiation.

A power stage 108 directly receives the signal on the line 106 via an OR element 110. The signal on the line 106 causes a monostable trigger circuit 112, whose output is connected to a second input of the OR element 110, to be triggered. In so far, the actuating circuit 62 equals a doubling of the corresponding circuit part of FIG. 1.

The output signal from the monostable trigger circuit 112 is furthermore given to the setting terminal S of an associated bistable trigger circuit 114, whose "1" output is connected to another input of the OR element 110.

The output signal from the monostable trigger circuit 112 passes via an inverter 116 to one input terminal of an OR element 118. The output signal from the latter is applied to the counting terminal C of a two-digit binary counter 120. The output terminal of the latter, which is associated with the number "2", is connected to one input of an OR element 122. The second input of the latter is connectable to a voltage source via a switch 124. The output of the OR element 122 is connected to the resetting terminals R of the bistable trigger circuits 114 and the resetting terminal R of the two-digit binary counter 120.

Roughly speaking, the above-described actuating circuit works in such a way that it releases the brake magnet for one co-ordinate direction for the fine setting of the nominal position only if the nominal position for the other co-ordinate direction has been substantially reached. In detail, let there be considered for illustration purposes a situation in which both carriages are initially unbraked, thereafter the nominal position in the x-direction is first reached and is slightly overshot and the nominal position in the y-direction is subsequently reached and slightly overshot. In such a setting operation, both bistable trigger circuits 114 are initially reset; no signal is applied to any of the inputs of the OR elements 110.

When the nominal position in the x-direction is overshot, the monostable trigger circuit 112x is triggered and the output signal therefrom causes the power stage 108x to be driven into the braking position. At the same time, the bistable trigger circuit 114x is set so that the power stage 108x continues to be in the working state of "braking" when the signal has decayed at the output of the monostable trigger circuit 112x. The trailing edge of the pulse generated by the monostable trigger circuit 112x causes the binary counter 120 to be brought to the reading "1".

With a time delay, the y nominal position is now also reached and overshot by the draughtsman so that the power stage 108y is also brought into the working stage of "braking" and is held therein, analogously to what has been stated above for the x-direction. The trailing edge of the pulse emitted by the monostable trigger circuit 112y now causes the binary counter 120 to be switched to the reading "2" so that the two trigger circuits 114 and the binary counter 120 are now reset. As a result, both power stages 108 are switched to the brake releasing position, and the draughtsman can move the drawing head to the nominal point, taking into consideration the respective deviation shown by the display board 68. If this is done slowly and with minimal force, then the power stages 108 are switched into the braking state directly via the output signal from the comparators 60 which is disposed on the lines 106. If the drawing head is once more moved beyond the nominal position in both co-ordinate directions by the use of force, the above-described cycle is launched analogously. If the drawing head is moved beyond the nominal position only in one co-ordinate direction, then the brake associated with the other co-ordinate direction continues to be permanently engaged; the brake for the co-ordinate direction in which the nominal point was again not reached is however released following the time span specified by the period of the monostable trigger circuit 112 if the switch 124 is closed by hand.

Figure 6:
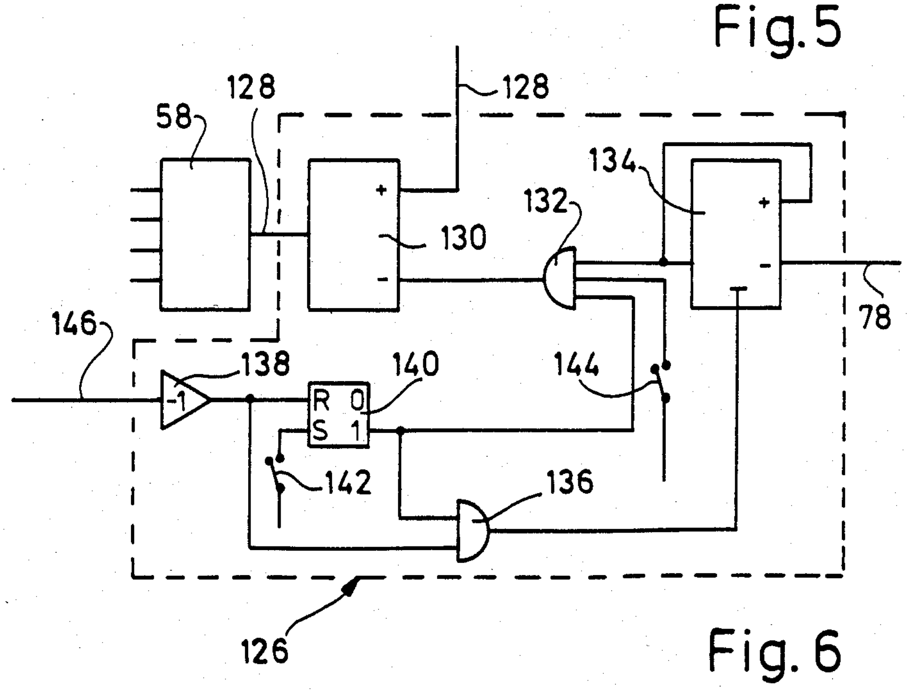
FIG. 6 shows an adaptive correction circuit for use with the carriage brake shown in FIG. 3.

FIG. 6 shows an adaptive correction circuit 126 which can be respectively inserted into the connection line 128 between the control panel 50 and the nominal-value stores 58.

A subtracting circuit 130 receives, at one input, the nominal-value signal transmitted by the control panel 50 and, at the other input, an adaptive correction signal which is provided by the output of a multiple AND element 132. For simplicity's sake, this element is shown as a single AND element but, in reality, comprises for each of the data lines a separate AND element, to the two further inputs of which there are applied additional input signals in the manner shown. There acts on the data inputs of the multiple AND element 132 an error computing circuit 134 which, when its clock terminal T is acted on, reads in the error signal disposed on the line 78. The clock terminal of the error computing circuit 134 is connected to the output of an AND element 136, one input of which is connected to the output of an inverter 138, which is connected to the line 106, and the second input of which is connected to the "1" output of a bistable trigger circuit 140.

The inverted signal on the line 106 is also applied to the resetting input of the bistable trigger circuit 140, whilst a signal is applied to the setting input of the bistable trigger circuit 140 by the closing of a switch 142. The "1" output of the bistable trigger circuit 140 is connected to a second input of the AND element 136. A signal can be applied to a third input of the latter by the closing of a switch 144.

The correction circuit 126 shown in FIG. 6 operates as follows:

If the switch 144 is closed, then no adaptive correction of the nominal-value signal, taking into consideration the error signal of the last setting operation, takes place.

If the switch 144 is closed and if the switch 142 is additionally closed at the beginning of a new setting of the drawing head, then the contents of the error computing circuit 134 are applied to the subtracting circuit 130 input which is the lower one in FIG. 6. A correspondingly reduced nominal-value signal is thus initially applied to the nominal-value store 58, that is to say the target point, when the drawing head is first moved towards the nominal position, has been advanced in accordance with the overshoot when the drawing head was last set so that, while the conditions of malfunction remain the same, a braking directly to the nominal position can be expected. After the expiration of the basic braking time specified by the monostable trigger circuit 114, the error computing circuit 134 is activated and modifies its output signal, taking into account the measured position deviation signal disposed on the cable 78. Since the bistable trigger circuit 140 is provided, this following-up of the error signal is effected only at the end of the first basic braking phase at a new setting of the drawing head but not at a second overshooting of the nominal point which, as a rule, occurs under different conditions. The bistable trigger circuit 140 furthermore ensures that the AND element 132 is blocked following the first braking of the carriage so that, for the fine setting, the unmodified nominal-value signal on the connection line 128 is given to the comparator 58.

Figure 7:
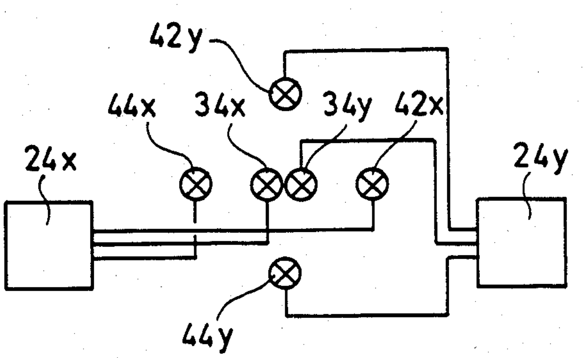
FIG. 7 shows a modified display for the deviation of the actual position from the nominal position for use with co-ordinate carriage brakes as shown in FIG. 2.

FIG. 7 shows a simple deviation display for two carriage brakes which are associated with co-ordinate directions which are perpendicularly disposed on each other. The basic construction of the individual carriage brakes corresponds to that of FIG. 2, so that only those parts of the circuit which are of interest for the display are to be considered here, equivalent components for the two co-ordinate directions again differing by "x" and "y". The light-emitting diodes 34, 42 and 44 for the two co-ordinate directions are arranged so as to be perpendicular to one another, the light-emitting diodes 34x and 34y being arranged so as to be very close to each other. In the display shown in FIG. 7, two of the light-emitting diodes are always lighted up, and the spatial arrangement of the lighted light-emitting diodes directly reveals the direction in which the drawing head carried by the carriages has to be moved so as to reach the nominal position.

Figure 8:
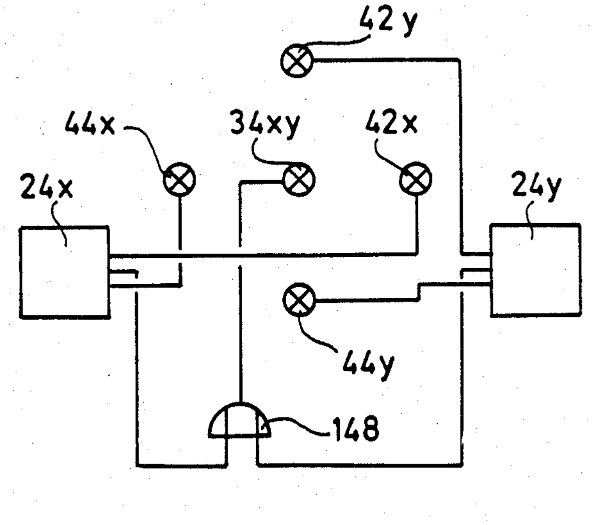
FIG. 8 shows an alternative display unit which is similar to FIG. 7.

The display shown in FIG. 8 largely corresponds to that shown in FIG. 7; the only difference is that instead of the lighting units 34$x$ and 34$y$ there is provided a single lighting unit 34$xy$ which is connected to the "=" output terminals of both comparators 24$x$ and 24$y$ via an OR element 148.

We claim:

1. An electronic carriage brake intended for a drawing machine and provided with an electrically controllable brake magnet and with a control system which is associated with the brake magnet and comprises:

a position sensor which co-operates with the carriage, a unit for inputting a desired position nominal value, a comparator to which output signals from the position sensor and from the input unit are applied, and a power stage which is connected to an output of the comparator for driving the brake magnet, characterised in further comprising a monostable trigger circuit (30), a clock terminal of which receives the output signal from the comparator (24), and an OR element (28) which combines an output signal from the monostable trigger circuit (30) and the output signal from the comparator (24), both of which output signals serve for triggering the power stage (18), an output of the OR element (28) being connected to an input terminal of the power stage (18).

2. A carriage brake as claimed in claim 1, characterised in that the power stage comprises two input terminals, upon the application of a signal to which the brake magnet (12) is excited to a varying degree, and in that the output of the OR element is connected to the first power stage (18) input terminal setting a lower braking force and an output of the monostable trigger circuit (30) is connected to the second power stage (18) input terminal setting a higher braking force.

3. A carriage brake as claimed in claim 1, characterised in that the output of the monostable trigger circuit (30) is connected via a switch (38) to a setting input of a bistable trigger circuit (36), whose "1" output is connected together by the OR element (34) with the output signal from the comparator (24) which, at the output side, is connected to the power stage (18).

4. A carriage brake as claimed in claim 1, characterised in that the brake magnet (12) is formed by a permanent magnet (14) and a field winding (16), which field winding (16) is excited by the power stage (18) for setting-up of a field compensating the field of the permanent magnet (14), and in that an inverted output signal from the OR element (28) is applied to the power stage (18).

5. A carriage brake as claimed in claim 1, and intended for a drawing machine provided with two independent carriages associated with the coordinate directions and provided with two brake magnets, each associated with respectively one of the carriages and with respectively one control system for the two brake magnets, characterised in that in each control system the output signal from the respective monostable trigger circuit (112) is applied to a setting terminal of a bistable trigger circuit (114), whose "1" output signal also serves for triggering the associated power stage (108), and in that there is applied to a resetting terminal of the bistable trigger circuit (114) of one control system, via a linkage network (116 to 122), the output signal from the monostable trigger circuit of the other control system in such a way that the brake magnet first driven into the braking position is only released when the carriage associated with the other co-ordinate direction has also substantially reached its nominal position.

6. A carriage brake as claimed in claim 5, characterised in that the linkage network comprises an OR element (118), to which inverted output signals from the monostable trigger circuits (112) are applied, and a counter (120) which is connected to the OR element and whose output signal corresponding to the number "2" serves for resetting both bistable trigger circuits (114) for the two co-ordinate directions.

7. A carriage brake as claimed in claim 1, characterised in that there is inserted between the input unit (50) and a nominal-value store (58) a subtracting circuit (130), a first input terminal of which is connected to the input unit and a second input terminal of which is connected to an output of an error computing circuit (134) at the beginning of a setting operation and which has a zero signal applied to it following the release of the brake magnet, and in that an activating terminal of the error computing circuit (134) is triggered by a trailing edge of the output signal from the monostable trigger circuit (114).

8. A carriage brake as claimed in claim 7, characterised in that the activating terminal of the error computing circuit (134) is triggered via an AND element (136), to a first input of which there is applied an inverted (138) output signal from the monostable trigger circuit (112) and a setting input of which is connected to a "1 " output terminal of a bistable trigger circuit (140), to a setting input of which there is applied to a signal via a brake releasing switch (142) and to a resetting terminal of which there is applied the inverted output signal from the monostable trigger circuit (112).

9. A carriage brake as claimed in claim 8, characterised in that there is inserted between the error computing circuit (134) and the second input of the subtracting circuit (130) an AND element (132), a second input of which is connected to the "1" output of the bistable trigger circuit (140) provided for the control of the error computing circuit (134).

10. A carriage brake as claimed in claim 1 and intended for a drawing machine with two independent carriages as well as two brake magnets associated therewith and comprising associated control systems, characterised in that the comparators (24) of the control systems provide at least three different output signals for the identicalness of the nominal value and the actual value and for the presence of a positive or negative difference of these values, and in that visual display units (68; 34, 42, 44), which are arranged in matrix form, are triggered by these output signals from the comparators.

11. A carriage brake as claimed in claim 10, characterised in that the visual display units are formed by addressable points of a display board (68) and in that column and line addressing of the display board (68) is effected by the output signals from the comparators (60) which are designed as digital difference computers.

12. A carriage brake as claimed in claim 11, characterised by addressing circuits (66) which convert output signals from the comparators (60) which correspond to a number that is larger than a specified number into a fixed output signal which causes an edge column or row of the display board (68) to be triggered.

13. A carriage brake as claimed in claim 10, characterised in that the comparators only provide signals which are associated with the identicalness of the nominal value and the actual value as well as with the presence of a positive or negative difference of these values, and in that there are provided one behind the other, parallel to the co-ordinate axes, sets of the display units which are associated with these signals, the display units (34) associated with the identicalness of the compared signals substantially coinciding in space.

14. A carriage brake as claimed in claim 13, the display units being formed by lighting units, characterised in that spatially combined display units (34) emit a light which is different in colour from the light emitted by display units (42, 44) which are associated with the positive and negative differences between the nominal value and the actual value.

15. A carriage brake as claimed in claim 14, characterised in that a single lighting unit (34xy), which is triggered via an OR element (148) from both comparators (24), is used for the spatially combined display units.

* * * * *